US012743922B2

(12) United States Patent
Bolling, Jr.

(10) Patent No.: US 12,743,922 B2
(45) **Date of Patent: *Sep. 22, 2026**

(54) SYSTEMS AND METHODS PROVIDING A SPINNING REEL INDICATOR SYMBOL TRIGGER MECHANISM ASSOCIATED WITH A DISPLAY POSITION

(71) Applicant: Aristocrat Technologies Australia Pty Limited, North Ryde (AU)

(72) Inventor: T. Grant Bolling, Jr., Maryland Heights, MO (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 54 days.

This patent is subject to a terminal disclaimer.

(21) Appl. No.: 17/461,282

(22) Filed: Aug. 30, 2021

(65) Prior Publication Data

US 2021/0390822 A1 Dec. 16, 2021

Related U.S. Application Data

(63) Continuation of application No. 15/647,957, filed on Jul. 12, 2017, now Pat. No. 11,120,660.

(51) Int. Cl.
*G07F 17/32* (2006.01)

(52) U.S. Cl.
CPC ...... *G07F 17/3213* (2013.01); *G07F 17/3209* (2013.01); *G07F 17/3225* (2013.01);
(Continued)

(58) Field of Classification Search
CPC .. G07F 17/34; G07F 17/3267; G07F 17/3244; G07F 17/3211; G07F 17/32;
(Continued)

(56) References Cited

U.S. PATENT DOCUMENTS 5,816,915 A * 10/1998 Kadlic .................... G07F 17/32
463/13
5,980,384 A * 11/1999 Barrie ................. G07F 17/3265
463/16

(Continued)

OTHER PUBLICATIONS

Australian Examination Report for AU2018204018, dated Jul. 23, 2019, 4 pages.

(Continued)

*Primary Examiner* — Ankit B Doshi
(74) *Attorney, Agent, or Firm* — ALG Intellectual Property, LLC

(57) ABSTRACT

A gaming machine includes a display, an indicator display device, a symbol selector, a function allocator, and an award allocator. The display includes display positions. The indicator display device is configured to visually display the indicator symbol for visually identifying a single display position. The symbol selector is configured to randomly select symbols from a set of symbols and, after display of the indicator symbol, place the selected symbols on the display with at least one of the selected symbols placed in each of the display positions including the single display position. The function allocator is configured to determine which symbol is placed in the single display positon and perform a game function in response to the identity of the selected symbol in the single display position. The award allocator may be configured to allocate an award based on at least one of the placed symbols.

20 Claims, 12 Drawing Sheets

(52) U.S. Cl.
CPC ...... *G07F 17/3244* (2013.01); *G07F 17/3267* (2013.01); *G07F 17/32* (2013.01)

(58) Field of Classification Search
CPC ............. G07F 17/3209; G07F 17/3213; G07F 17/3262; G07F 17/3274
See application file for complete search history.

(56) References Cited

U.S. PATENT DOCUMENTS

| | | | | |
|---|---|---|---|---|
| 6,146,271 | A | 11/2000 | Kadlic | |
| 2001/0031659 | A1* | 10/2001 | Perrie | A63F 3/0645 463/18 |
| 2002/0045474 | A1 | 4/2002 | Singer | |
| 2003/0013531 | A1* | 1/2003 | Rowe | G07F 17/3248 463/42 |
| 2003/0054874 | A1* | 3/2003 | Kaminkow | G07F 17/32 463/20 |
| 2003/0209598 | A1* | 11/2003 | Dollhopf | G07D 11/40 235/375 |
| 2003/0232638 | A1* | 12/2003 | Luciano, Jr. | G07F 17/32 463/19 |
| 2004/0038733 | A1* | 2/2004 | Walker | G07F 17/3244 463/25 |
| 2004/0053675 | A1* | 3/2004 | Nguyen | G07F 17/3234 463/20 |
| 2004/0198481 | A1 | 10/2004 | Herrington | |
| 2006/0025206 | A1* | 2/2006 | Walker | G07F 17/32 463/20 |
| 2006/0105836 | A1 | 5/2006 | Walker | |
| 2007/0060248 | A1* | 3/2007 | Rodgers | G07F 17/32 463/16 |
| 2008/0188288 | A1* | 8/2008 | Seelig | G07F 17/3202 463/20 |
| 2009/0131145 | A1 | 5/2009 | Aoki | |
| 2010/0004045 | A1* | 1/2010 | Roemer | G07F 17/3255 463/43 |
| 2011/0009197 | A1* | 1/2011 | Peltz | G07F 17/3246 463/46 |
| 2015/0099575 | A1* | 4/2015 | Elias | G07F 17/3262 463/25 |
| 2016/0110943 | A1* | 4/2016 | Nicely | G07F 17/3269 463/20 |
| 2017/0092059 | A1* | 3/2017 | Nelson | G07F 17/3225 |
| 2017/0092069 | A1* | 3/2017 | Pececnik | G07F 17/3269 |
| 2017/0330420 | A1* | 11/2017 | Merati | G07F 17/3258 |

OTHER PUBLICATIONS

Office Action dated May 11, 2020 for U.S. Appl. No. 15/647,957 (pp. 1-11).
Notice of Allowance dated May 25, 2021 for U.S. Appl. No. 15/647,957 (pp. 1-7).
Corrected Notice of Allowability dated Jun. 9, 2021 for U.S. Appl. No. 15/647,957 (pp. 1-2).

* cited by examiner

SYSTEMS AND METHODS PROVIDING A SPINNING REEL INDICATOR SYMBOL TRIGGER MECHANISM ASSOCIATED WITH A DISPLAY POSITION

RELATED APPLICATIONS

This application is a continuation of U.S. patent application Ser. No. 15/647,957, filed Jul. 12, 2017, the disclosure of which is hereby incorporated by reference in its entirety.

BACKGROUND

In electronic gaming systems such as spinning reel gaming machines, a plurality of mechanical or simulated reels spin and stop to reveal symbols. The symbols are evaluated to determine if a winning combination has been revealed and to determine a prize, if any, to award a player.

While such gaming systems provide players with enjoyment, a need exists for new gaming systems in order to maintain or increase player enjoyment.

BRIEF SUMMARY

A system and/or method providing a spinning reel indicator symbol trigger mechanism associated with a display position is disclosed, substantially as shown in and/or described in connection with at least one of the figures, as set forth more completely in the claims.

These and other advantages, aspects and novel features of the disclosure, as well as details of an illustrated embodiment thereof, will be more fully understood from the following description and drawings.

BRIEF DESCRIPTION OF THE DRAWINGS

Embodiments of the disclosure will now be described with reference to the accompanying drawings in which.

DETAILED DESCRIPTION

Figure 1:
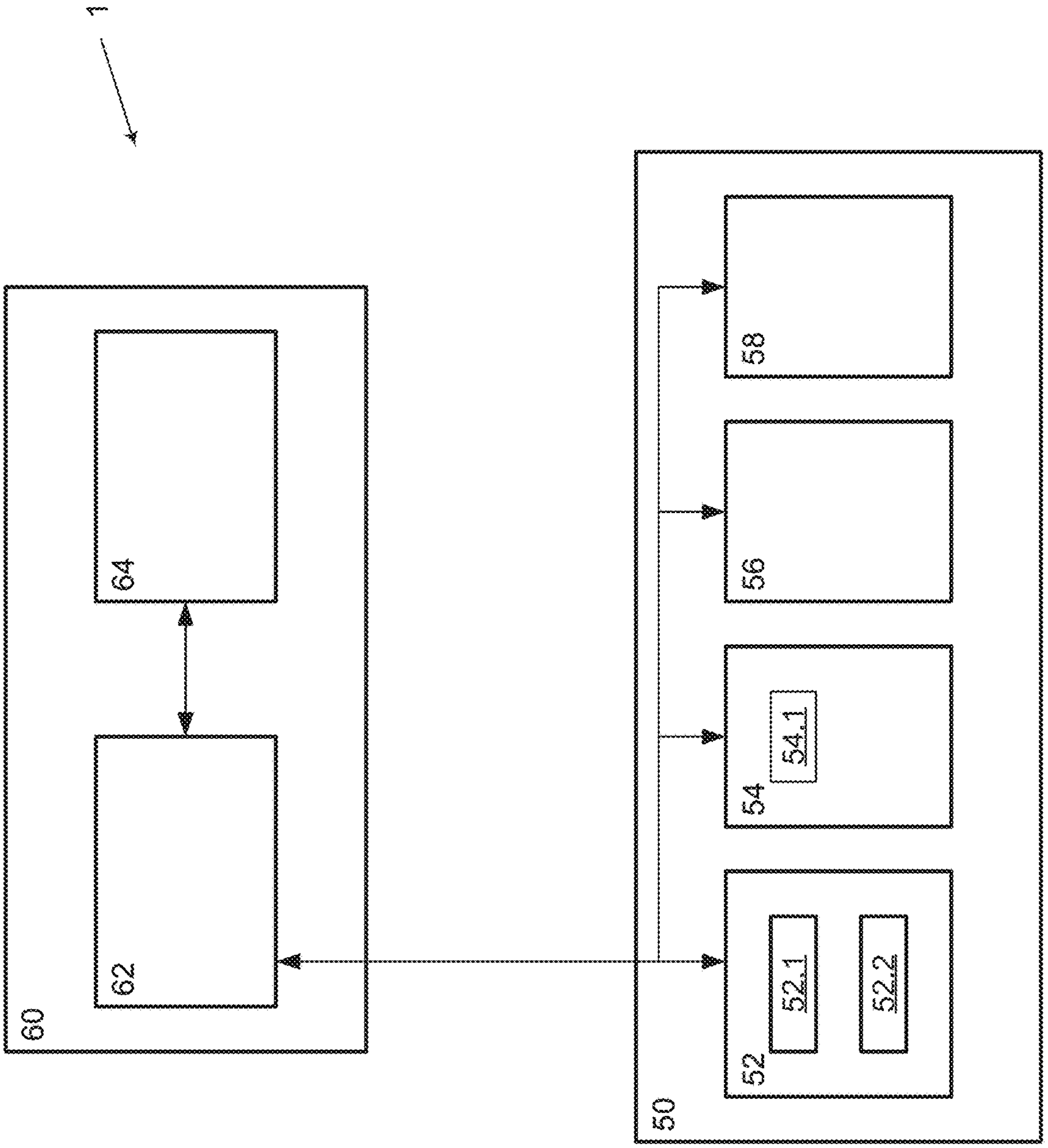
FIG. 1 is a block diagram of the core components of a gaming system.

Referring to the drawings, there is shown an embodiment of a gaming system having a gaming machine that includes a credit input mechanism to receive a physical item representing a monetary value for establishing a credit balance, the credit balance being increasable and decreasable based at least on wagering activity. The gaming machine also includes hardware meters to monitor the credit balance, and a display configured to present a spinning reel game having an array of display positions. For example, the array of display positions may be a grid of three rows and five columns or any suitable configuration. The gaming system is configured to present an indicator symbol at a selected display position in the array of display positions. The selected display position may be randomly selected or may be a default position such as a center display position, among other things. In certain embodiments, the indicator symbol may be a circular or any suitably shaped component configured to surround at least a portion of a single display position while allowing a symbol subsequently presented at the display position to be viewable through and/or within the circular component. In various embodiments, an animated character or symbol may point to and/or otherwise be associated with the indicator symbol to draw attention to the indicator symbol prior to spinning the reels of the game. The gaming system is configured to spin and stop reels of the game such that symbols are selected and displayed at each display position in the array of display positions, including the selected display position having the indicator symbol, after the indicator symbol is presented at the selected display position. In an exemplary embodiment, the reels may spin simultaneously with and/or separately from each other. The gaming system determines the symbol that is presented at the selected display position having the indicator symbol and may trigger game play functionality based on the identity of the determined symbol.

In various embodiments, if a first symbol type is at the selected display position identified by the indicator symbol when the reels stop spinning, a second symbol type at one or more other display positions may change to a WILD symbol, a highest value symbol, or any suitable symbol. For example, a four pixies symbol presented at the selected display position having the indicator symbol may trigger the gaming system to change pixie symbols presented at other display positions to a WILD symbol. Additionally and/or alternatively, the gaming system may be configured to change the four pixies symbol to a WILD symbol, a highest value symbol, or any suitable symbol. The symbols at the display positions after the change may be evaluated by the gaming system to determine a game outcome and, if appropriate, to allocate an award.

In an exemplary embodiment, if a WILD symbol is presented at the selected display position identified by the indicator symbol after the reels stop spinning, the WILD symbol may be held, a new indicator symbol display position may be selected, and a re-spin of the reels to change the non-held symbols may be performed. If a second WILD symbol is presented at the new indicator symbol display position, the first and second WILD symbols may be held, a new indicator symbol display position may be selected, and a re-spin of the reels to change the non-held symbol may be performed. The gaming system may award a player an outcome based on the symbols displayed at the end of each spin. The feature may end if no further WILD symbols land within the indicator symbol display position.

In certain embodiments, the gaming system may award a progressive jackpot prize if a progressive jackpot symbol is at the selected display position identified by the indicator symbol when the reels stop spinning. For example, the spinning reel game may include symbols identifying one or more progressive jackpot prizes, such as mini, minor, major, and grand prize levels, or any suitable prize level. In various embodiments, each of the prize levels may be associated with a progressive prize value.

In a representative embodiment, the gaming system may evaluate the display positions after the reels stop spinning to determine whether a predetermined number of scatter symbols, such as three or more, are present. The presence of the predetermined number of scatter symbols may trigger a number of free spins/games. During the free spins/games, additional feature symbols may be added to the reels to increase the chance of an event being triggered based on the presence of a particular symbol at the selected display position identified by the indicator symbol. For example, additional four pixie symbols, WILD symbols, and/or progressive jackpot symbols may be added to the reels to increase the chance of one of the above-described events occurring.

In various embodiments, the gaming system may evaluate the display positions after the reels stop spinning to determine a number of WILD symbols that are present in the array. The size of the indicator symbol may grow in size according to the number of WILD symbols in the array of display positions. For example, if three WILD symbols appear, the gaming system may increase the size of the indicator symbol to surround two display positions.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface 50 may enable manual interaction between a player and the gaming system 1 and for this purpose includes the input/output components required for the player to enter instructions to play the game and observe the game outcomes.

Components of the player interface may vary from embodiment to embodiment but will typically include a credit mechanism 52 to enable a player to input credits. For example, in some embodiments, the credit mechanism 52 may include a credit input mechanism 52.1 to receive a physical item representing a monetary value for establishing a credit balance. The credit balance may be increasable and decreasable based wagering activities. In some embodiments, the credit mechanism 52 also includes a payout mechanism 52.2 to cause a payout associated with the credit balance. The player interface may also include one or more displays 54, a game play mechanism 56 including one or more input devices that enable a player to input game play instructions (e.g. to place a wager), one or more speakers 58. In some embodiments, each of the displays 54 includes a plurality of display positions. In other embodiments, each of the display 54 includes a plurality of display areas. Each of the display areas includes a plurality of display positions. In the embodiment shown, the display 54 also includes a credit meter 54.1. In some embodiments, the credit meter 54.1 displays credits available, credits bet, and/or credits won.

The game controller 60 is in data communication with the player interface 50 and typically includes a processor 62 that processes the game play instructions in accordance with game play rules and outputs game play outcomes to the display(s) 54. Typically, the game play rules are stored as program code in a memory 64 but can also be hardwired. In some embodiments, the memory 54 may also store data indicative of a plurality of symbols, pay tables, images, and other information to be used in games. Herein the term "processor" is used to refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
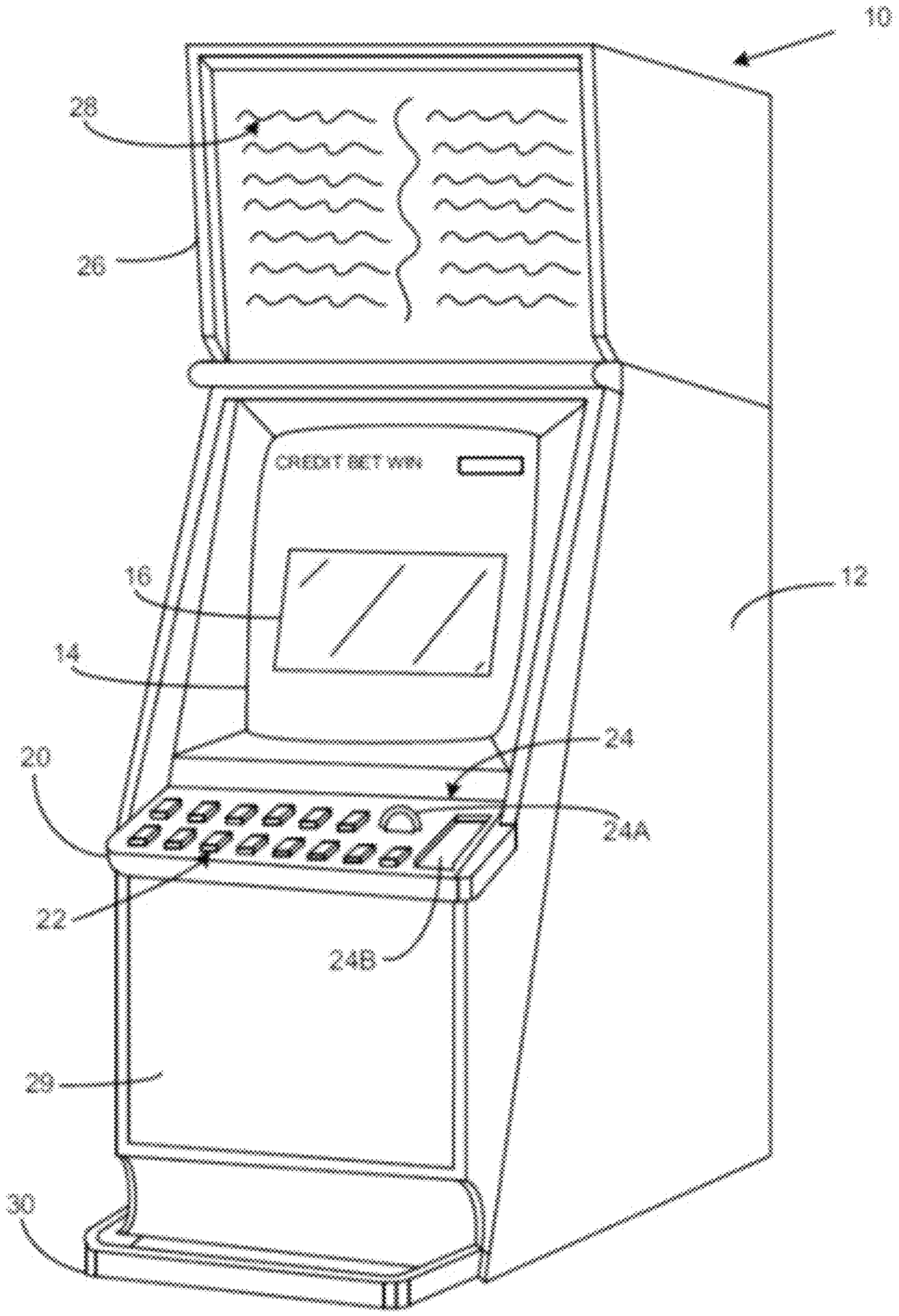
FIG. 2 is a perspective view of a standalone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 (similar to the credit input mechanism 52.1 of FIG. 1) which in this example includes a coin input chute 24A and a bill collector 24B. Other credit input mechanisms may also be employed, for example, a card reader for reading a smart card, debit card or credit card. Other gaming machines may be configured to accept a ticket such that the credit input mechanism 24 may have a ticket reader (not shown) for reading tickets having a value and crediting the player based on the face value of the ticket. A player marketing module (not shown)

having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. The gaming machine 10 also includes a payout mechanism in the form of a coin tray 30 that is mounted beneath the front panel 29 for dispensing cash payouts from the gaming machine 10. Another form of a payout mechanism may include an embedded printer (similar to printer 109 of FIG. 3) to print out a payout ticket associated with the credit balance that may be redeemed at a cage (not shown).

The display 14 shown in FIG. 2 is in the form of a liquid crystal display. Alternatively, the display 14 may be a light emitting diode display, plasma screen, and/or any other suitable video display unit. The top box 26 may also include a display, for example a video display unit, which may be of the same type as the display 14, or of a different type.

Figure 3:
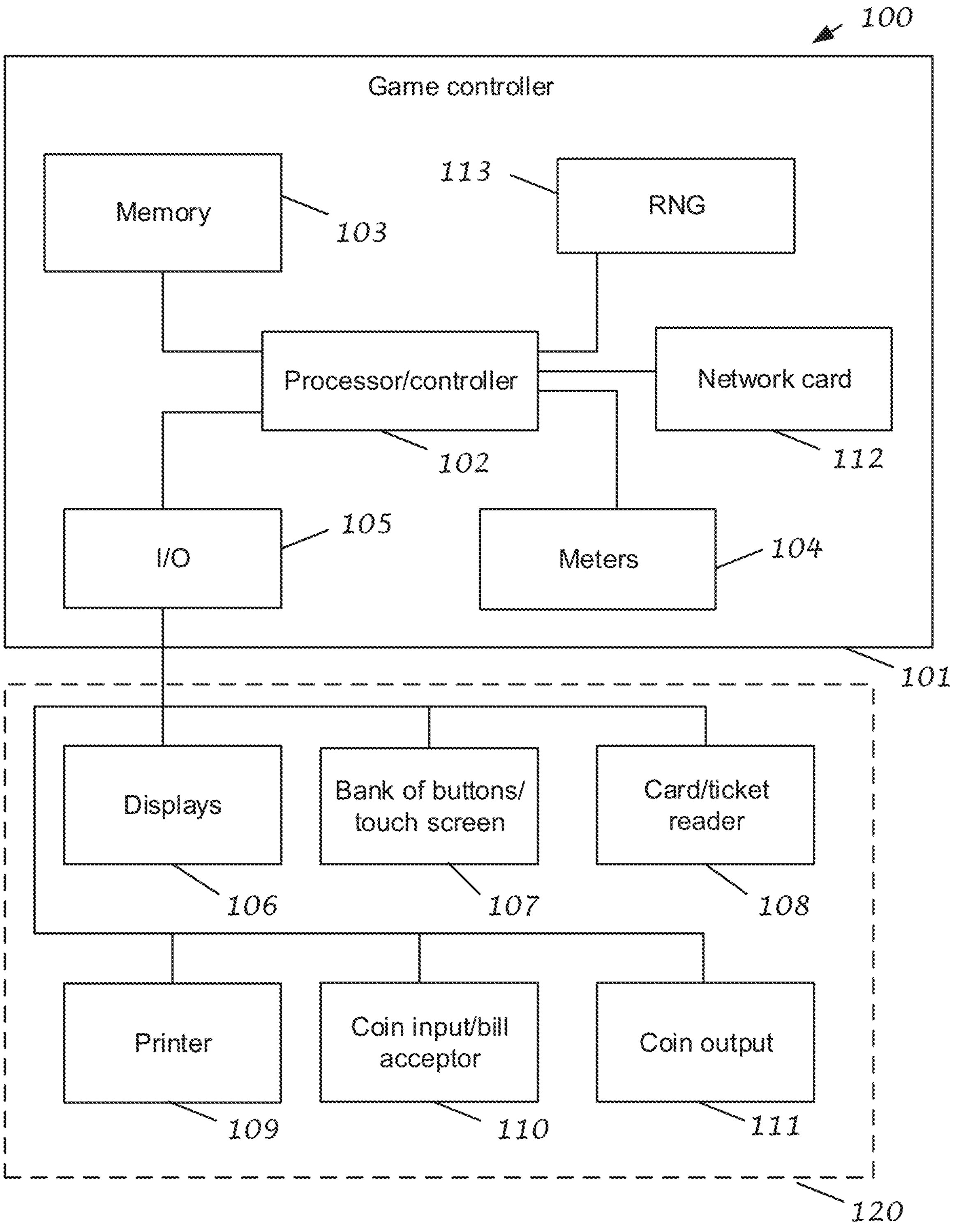
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game, any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
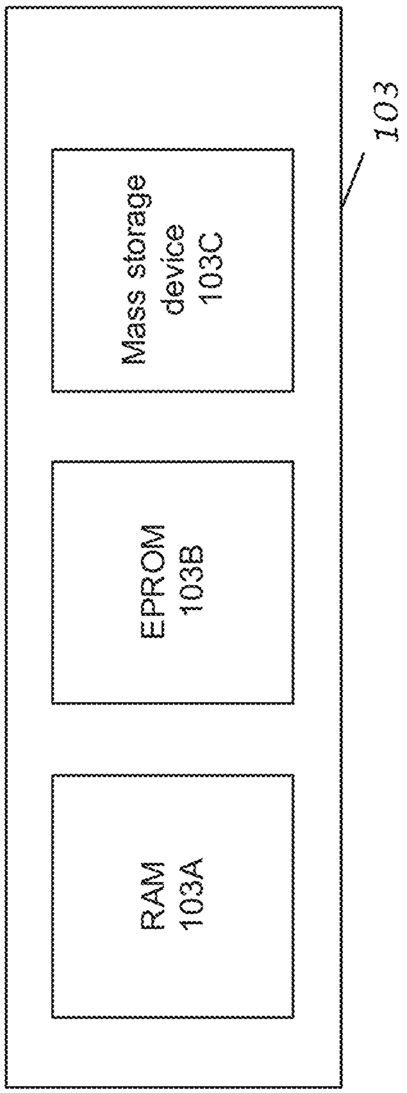
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
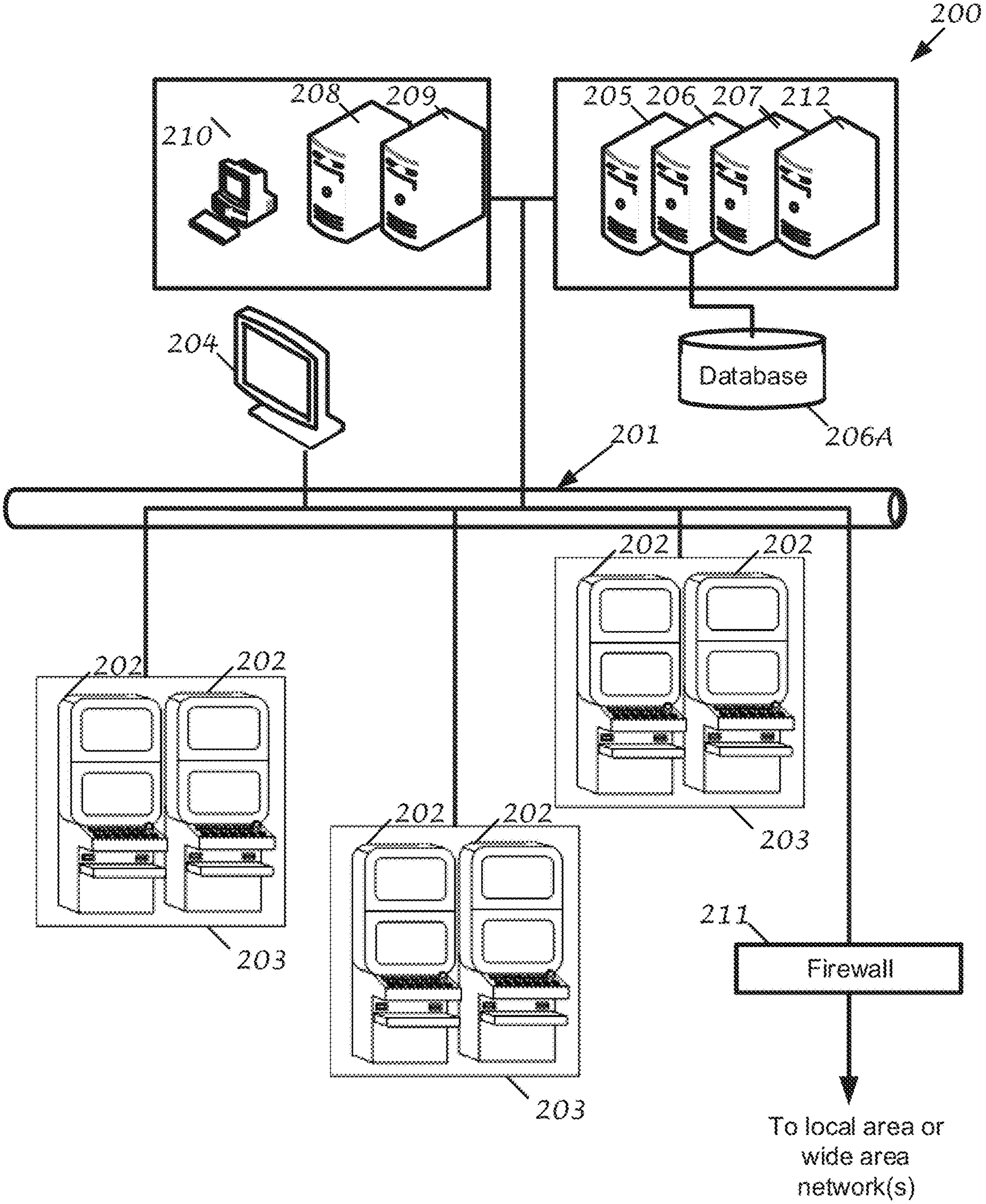
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager for the game and to initiate a play of the game. In an exemplary embodiment, at least certain of the wagers that the player can wager entitles the player to a spinning reel game as shown in FIGS. 8-10.

In an embodiment, the game outcome is evaluated in the same way to determine whether the selected symbols of the game outcome correspond to a winning outcome. In one embodiment, each displayed symbol of each reel can be used to form symbol combinations with symbols displayed at a designated with each displayed symbol of each of the other reels with one symbol display position of each reel being used in any combination. For example, if there are five reels and three symbol display positions for each reel such that the symbol display positions comprise three rows, the total number of ways to win is determined by multiplying the number of symbol display positions of each reels. As a result for five reels and fifteen display positions there are 243 ways to win. For five reels and four symbol display positions per reel there are 1024 ways to win.

Figure 6:
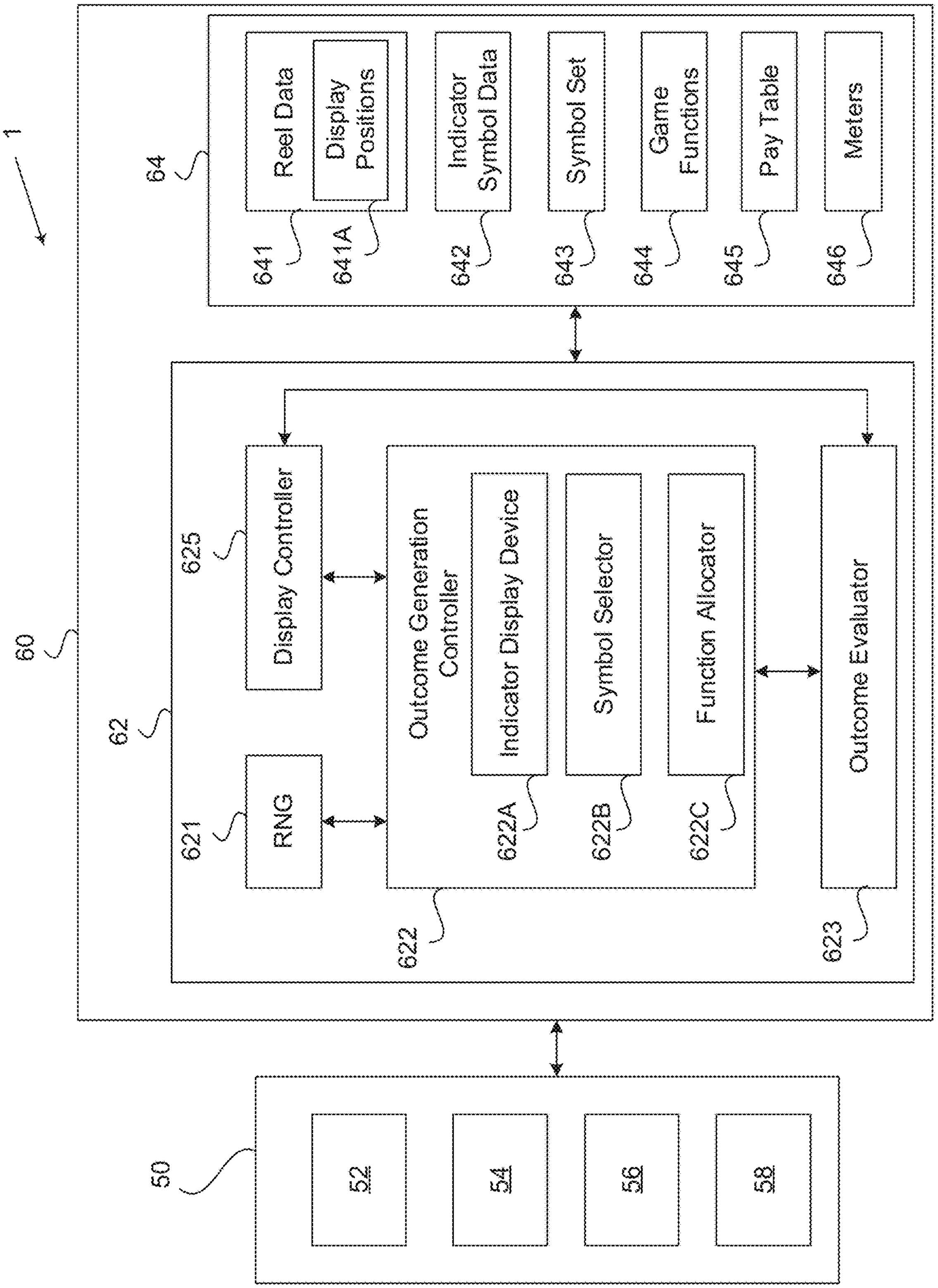
FIG. 6 is a further block diagram of a gaming system.

In FIG. 6, the processor 62 of game controller 60 of gaming system 1 is shown implementing a number of modules based on game program code 641-646 stored in memory 64. Persons skilled in the art will appreciate that various modules could be implemented in some other way, for example by a dedicated circuit.

These modules include display controller 625 which controls the display 54 to present the game display 800 having a number of reels defined by reel data 641 stored in memory 64. The reel data 641 may include display position information 641A defining a number of display positions 802 presented in the reels at the game display 800. For example, the reel data 641 and display position information 641A may define five reels each having three display positions 802 forming an array of five columns and three rows as illustrated in FIGS. 8-10.

The outcome generation controller 622 operates in response to the player's operation of game play mechanism 56 to place a wager and/or initiate a play of the game and generates a game outcome shown by game display 800 that is provided to the display controller 625 for presentation at the display 54. The outcome generation controller 622 may comprise suitable logic, circuitry, interfaces and/or code that may be configured to present an indicator symbol 810 at a selected display position 802, select and display symbols 820, 822, 824, 826, 828 at display positions 802, and trigger game functions based at least on the symbol 820, 822, 824, 826, 828 displayed at the selected display position 802 having the indicator symbol 810. The outcome generation controller 622 may comprise an indicator display device 622A, a symbol selector 622B, and a function allocator 622C.

The indicator display device 622A may be configured to select a display position 802 to present an indicator symbol 810 as specified by indicator symbol data 642 using random number generator 621. The selected display position 802 of the indicator symbol 810 and characteristics of the indicator symbol 810 are advised to the display controller 625 which causes the indicator symbol 810 to be displayed on display 54 at the appropriate display position 802. The indicator symbol data 642 may define the indicator symbol 810 as a circular or any suitably shaped component configured to surround at least a portion of a single display position 802 while allowing a symbol 820, 822, 824, 826, 828 subsequently presented at the display position 802 to be viewable through and/or within the indicator symbol 810. The indicator symbol data 642 may define probabilities for positioning the indicator symbol 810 at different display positions 802. For example, the indicator symbol data 642 may be weighted to place the indicator symbol 810 at a display position 802 on one of the last three reels to stop spinning to increase player anticipation of visualizing the symbol 820, 822, 824, 826, 828 displayed at the selected display position 802 having the indicator symbol 810. Additionally and/or alternatively, the indicator symbol may define a fixed display position for presenting the indicatory symbol 810, such as a center display position of the center reel, among other positions. In various embodiments, the indicator symbol data 642 may include data defining the characteristics of the indicator symbol 810 and/or an animated character or symbol 812 pointing to and/or otherwise being associated with the indicator symbol 810 to draw attention to the indicatory symbol 810. The indicator symbol data 642 may define characteristics of the indicator symbol 810 such as the shape and appearance of the indicator symbol 810. For example, the indicator symbol 810 may be a "Magic Circle" having one or more small objects (e.g., bulges) disposed on the circle that move around the circle and serve to call attention to the indicator symbol 810. The indicator symbol data 642 may define characteristics of the animated character or symbol 812 such as the shape and appearance of the animated character or symbol 812. As an example, the animated character or symbol 812 may be a pixie character pointing at or holding the "Magic Circle." The pixie character 812 may appear before the reels spin and may then disappear from the display as the reels begin to spin so as not to block a player's visualization of the symbols 820, 822, 824, 826, 828 displayed at the display positions 802.

The symbol selector 622B may be configured to select symbols 820, 822, 824, 826, 828 from a symbol set 643 stored in memory 64 using random number generator 621. The selected symbols are advised to the display controller 625 which causes them to be displayed on display 54 at a set of display positions 802.

The function allocator 622C may be configured to perform gaming functions as defined by game functions 644 stored in memory 64 based on the symbols 820, 822, 824, 826, 828 presented at the display positions 802 in the game display 800 on the display 54. The game functions 644 may define actions based on the symbol 820, 822, 824, 826, 828 presented at the display position 802 associated with the indicator symbol 810. For example, the game functions 644 may specify that if a first symbol type is at the selected display position 802 identified by the indicator symbol 810 when the reels stop spinning, a second symbol type at one or more other display positions 802 may change to a WILD symbol 826, a highest value symbol, or any suitable symbol. As another example, the game functions 644 may specify that if a WILD symbol 826 is presented at the selected display position 802 identified by the indicator symbol 810 after the reels stop spinning, the WILD symbol 826 may be held, a new indicator symbol display position may be selected, and a re-spin of the reels to change the non-held symbols may be performed. Additionally and/or alternatively, the game functions 644 may define actions based on the symbols 820, 822, 824, 826, 828 presented at all or a subset of display positions 802. For example, the game functions 644 may specify that the presence of a predetermined number of scatter symbols may trigger a number of free spins/games. As another example, the game functions 644 may specify that a size of the indicator symbol 810 may grow to encompass multiple display positions 802 according to the number of WILD symbols 826 in the array of display positions 802.

The outcome generation controller 622 generates a game outcome which will then be evaluated by outcome evaluator 623 (also referred to as an award allocator) to determine whether it includes any winning combinations based on pay table 645. If winning combinations are included, the win meter associated with the player and stored in meters 646 is updated. At the conclusion of the games, the wins are transferred to the credit meter (assuming that they are not gambled). In various embodiments, an award may never actually be physically received by a player. For example, many gaming systems provide a player with a double or nothing gamble feature, where the player can double or forfeit their credits before commencing another play of the game or cashing. Starting another play of the game will cause the credits to be transferred to the credit meter of meters 646. Further, as credits are fungible, once credits have been added to the credit meter it is not possible to distinguish between credits which exist because the player has input cash or the like and credits resulting from an award.

Figure 7:
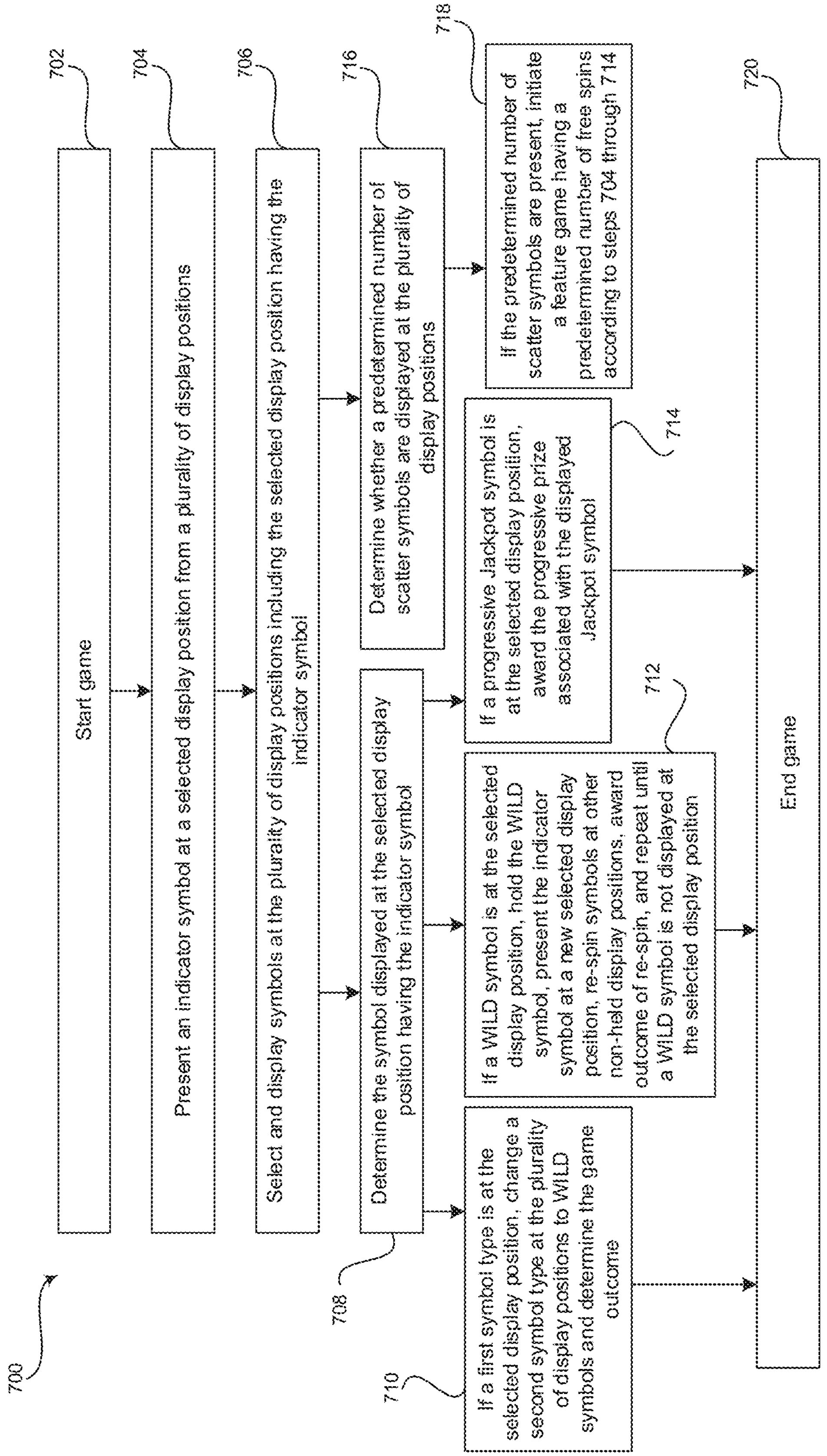
FIG. 7 is a flow chart of an exemplary embodiment providing a spinning reel indicator symbol trigger mechanism associated with a display position.

FIG. 7 is a flow chart of an exemplary embodiment providing a spinning reel indicator symbol trigger mechanism 810 associated with a display position 802 having steps 702-720, in accordance with an embodiment of the invention. Referring to FIG. 7, there is shown a flow chart 700 comprising exemplary steps 702 through 720. Certain embodiments of the present invention may omit one or more of the steps, and/or perform the steps in a different order than the order listed, and/or combine certain of the steps discussed below. For example, some steps may not be performed in certain embodiments of the present invention. As a further example, certain steps may be performed in a different temporal order, including simultaneously, than listed below.

At step 702, the game is started by a processor 62 of a game controller 60 at a gaming system 1. The game may be a standalone game or a bonus game launched from a primary game, among other things. The game is a spinning reel game having a number of reels each having a number of display positions 802. For example, the spinning reel game may have five reels each having three display positions 802 forming an array of five columns and three rows as illustrated in FIGS. 8-10. The game may be associated with a theme. For example, FIGS. 8-10 are screenshots of the spinning reel game having a pixie theme having various pixie characters 812 and symbols 822, 824.

At step 704, the processor 62 of the game controller 60 at the gaming system 1 presents an indicator symbol 810 at a selected display position 802 from a plurality of display positions 802. For example, the processor 62 may select one of the display positions 802 in the array of five columns and three rows presented at the game display 800. The processor 62 may include an outcome generation controller 622 having an indicator display device 622A to select the display position 802 based on indicator symbol data 642 and/or a random number generator 621. The indicator symbol data 642 may define a fixed display position 802 or a probability of each of the display positions 802 being selected as the selected display position. For example, the indicator symbol data 642 may specify that the fixed display position is a center row and center column of the array of display positions 802. As another example, the indicator symbol data 642 may define that display positions 802 in the last three reels to stop spinning have a higher probability of being selected than the first reels to stop spinning to increase the excitement level of a user of the spinning reel game. Additionally and/or alternatively, each display position 802 may have an equal probability of being selected as the selected display position 802. In certain embodiments, the indicator symbol data 642 may define that the selected display position 802 moves after each spin/game to a new display position 802 different from the present display position. The indicator symbol 810 may call attention to and/or otherwise identify the selected display position 802. For example, the indicator symbol 810 may be a circular or any suitably shaped component configured to surround at least a portion of the selected display position 802 while allowing a symbol 820, 822, 824, 826, 828 subsequently presented at the display position 802 to be viewable through and/or within the indicator symbol 810. In an exemplary embodiment, an animated character or symbol 812 may be provided with the indicator symbol 810 to call additional attention to the indicator symbol 810. The selected display position 802 of the indicator symbol 810, the characteristics of the indicator symbol 810, and any associated animated character or symbol 812 characteristics are provided by the indicator display device 622A to a display controller 625 for presentation in the game display 800 on display 54 at the appropriate display position 802.

At step 706, the processor 62 of the game controller 60 at the gaming system 1 selects and displays symbols 820, 822, 824, 826, 828 at the plurality of display positions 802 including the selected display position having the indicator symbol 810. For example, the processor 62 may include an outcome generation controller 622 having a symbol selector 622B configured to select symbols 820, 822, 824, 826, 828 from a symbol set 643 using a random number generator 621. The selected symbols 820, 822, 824, 826, 828 may be provided by the symbol selector 622B to a display controller 625 of the processor 62 for presentation in the game display 800 on display 54 at a set of display positions 802.

At step 708, the processor 62 of the game controller 60 at the gaming system determines the symbol 820, 822, 824, 826, 828 displayed at the selected display position 802 having the indicator symbol 810. For example, the processor 62 may comprise an outcome generation controller 622 having a function allocator 622C configured to apply game functions 644 as described below with respect to steps 710, 712, and 714 based on the symbol 820, 822, 824, 826, 828 presented at the selected display position 802 having the indicator symbol 810.

Figure 8A:
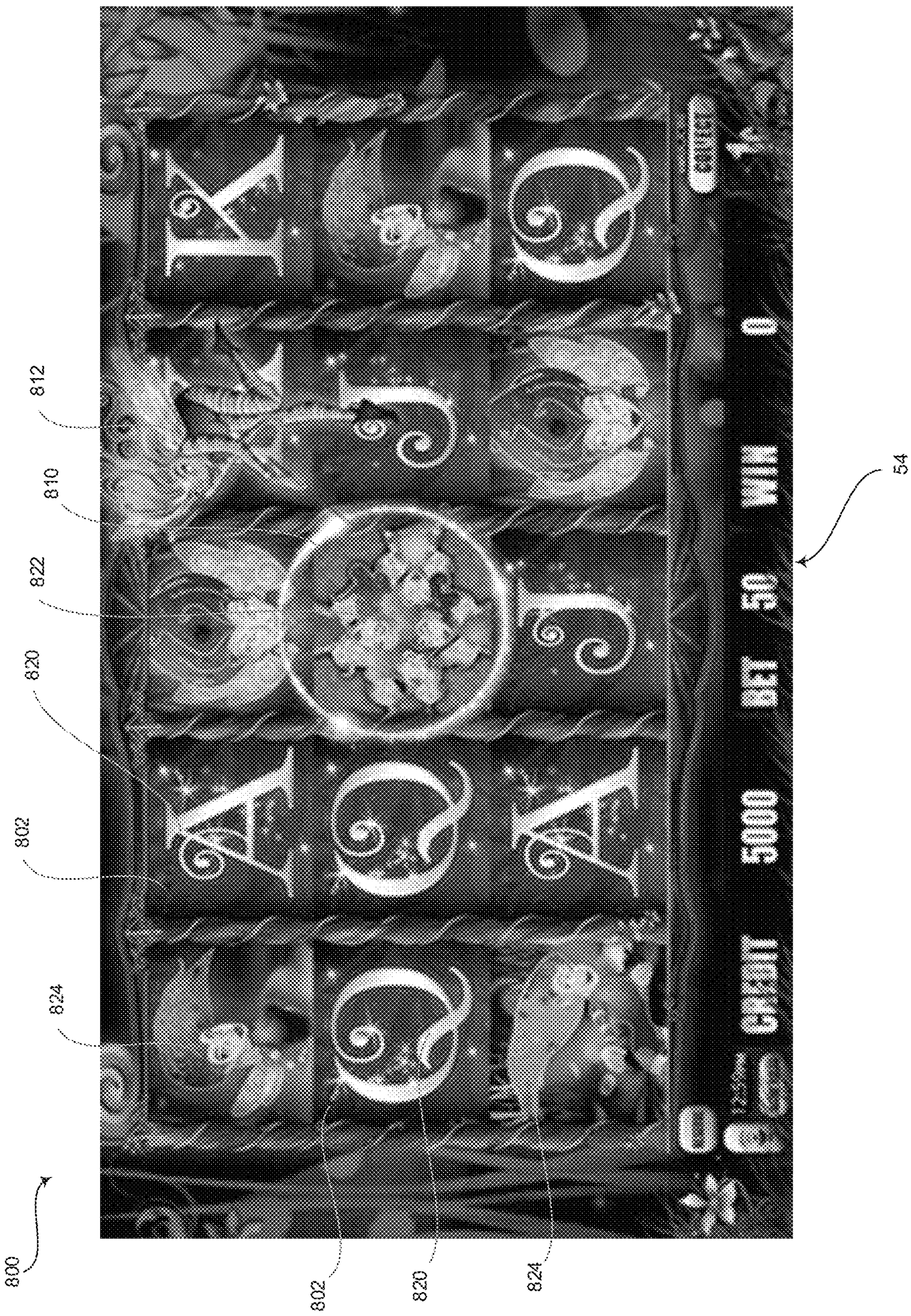
FIG. 8A is a screen shot of an example of a display of a spinning reel game having an indicator symbol associated with a display position that is presenting a first symbol type.
Figure 8B:
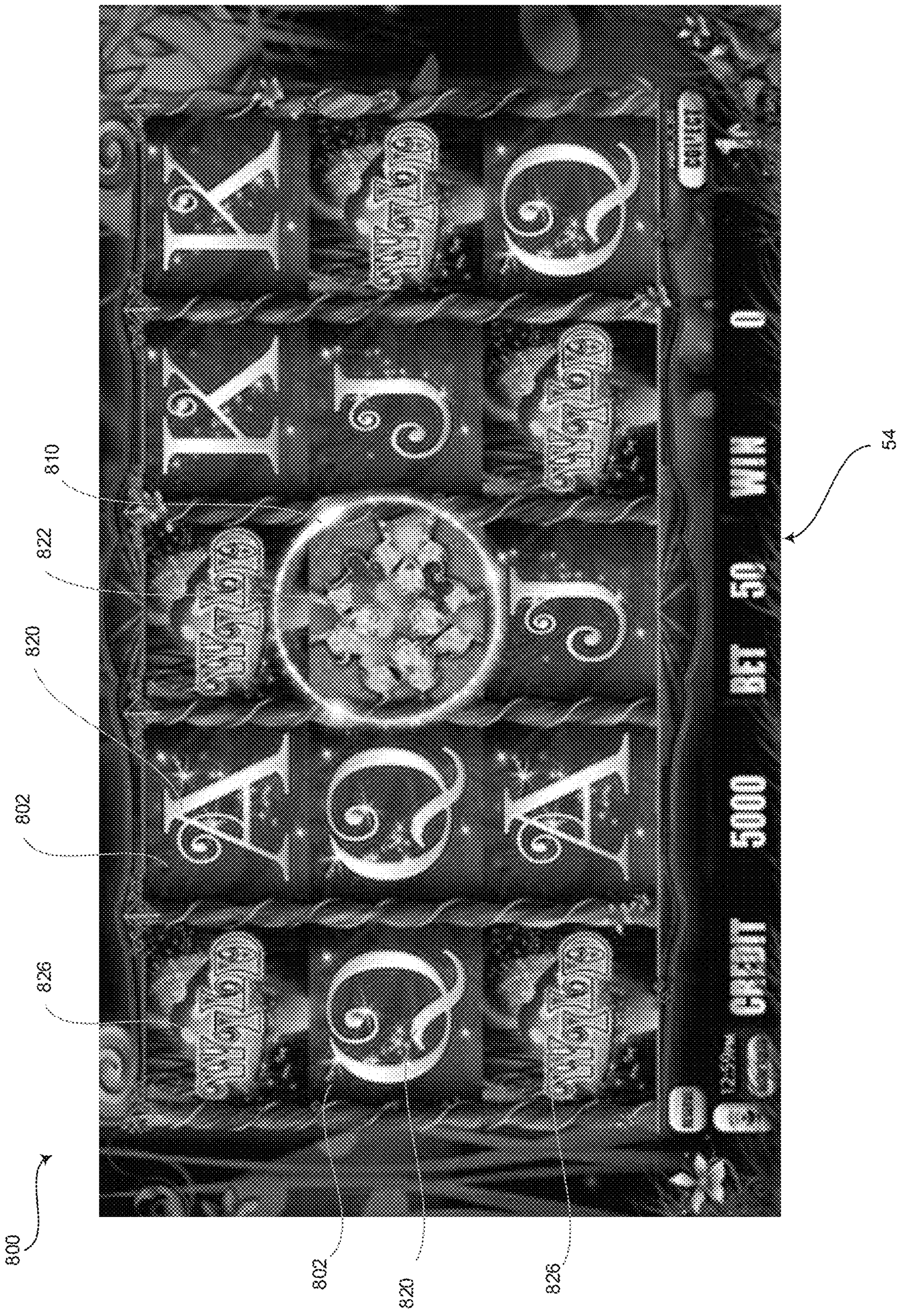
FIG. 8B is a screen shot of an example of a display of a spinning reel game triggering a change of a second symbol type at other display positions from FIG. 8A to WILD symbols in response to the first symbol type being detected at the display position associated with the indicator symbol.

At step 710, if a first symbol type 822 is at the selected display position 802 identified by the indicator symbol 810 when the reels stop spinning, the processor 62 of the game controller 60 at the gaming system 1 changes a second symbol type 824 at one or more other display positions 802 to a WILD symbol 826 and determines the game outcome. For example, the processor 62 may comprise an outcome generation controller 622 having a function allocator 622C configured to apply a game function 644 to change the second symbol type 824 to a WILD symbol, a highest value symbol, or any suitable symbol, in response to a determination that the symbol at the selected display position 802 identified by the indicator symbol 810 is a first symbol type 822. Referring to FIGS. 8A and 8B, a four pixies symbol 822 presented at the selected display position 802 having the indicator symbol 810 triggers the change of the pixie symbols 824 presented at other display positions 802 to a WILD symbol 826. In various embodiments, the function allocator 622C may be configured to change the four pixies symbol 822 to a WILD symbol 826, a highest value symbol, or any suitable symbol. Although, FIGS. 8A and 8B illustrate the first symbol type being the four pixies symbol 822 and the second symbol type being the pixie symbols 824, the first and second symbol types may be any suitable symbol type as defined by the game functions 644. The symbols 820, 822, 824, 826, 828 at the display positions 802 in the array of display positions 802 after the change may be evaluated by an outcome evaluator 623 of the processor 62 to determine a game outcome and, if appropriate, to allocate an award.

At step 712, if a WILD symbol 826 is presented at the selected display position 802 identified by the indicator symbol 810 after the reels stop spinning, the processor 62 of the game controller 60 at the gaming system 1 holds/freezes the WILD symbol 826, selects a new indicator symbol 810 display position 802, and re-spins the reels to change the non-held symbols. Moreover, if a second WILD symbol 826 is presented at the new indicator symbol 810 display position 802, the processor 62 of the game controller 60 at the gaming system 1 holds/freezes the first and second WILD symbols 826, selects a new indicator symbol 810 display position 802, and re-spins the reels to change the non-held symbols. The processor 62 of the game controller 60 at the gaming system 1 may award a player an outcome based on the symbols 820, 822, 824, 826, 828 at the display positions 802 in the array of display positions 802 after each spin. The feature may end if no further WILD symbols 826 land within the indicator symbol 810 display position 802. In various embodiments, a hold/freeze indicator symbol 814 may be provided at the display position(s) associated with held/frozen symbols. Although the above example refers to holding/freezing WILD symbols, in certain embodiments it is contemplated that any suitable symbol as defined by the game functions 644 may be held/frozen at step 712.

At step 714, the processor 62 of the game controller 60 at the gaming system 1 may award a progressive jackpot prize if a progressive jackpot symbol 828 is at the selected display position 802 identified by the indicator symbol 810 when the reels stop spinning. For example, the processor 62 may comprise an outcome evaluator configured to provide a progressive jackpot award corresponding with a progressive jackpot symbol 828 landing in the selected display position 802 corresponding with the indicator symbol 810. In certain embodiments, the spinning reel game 800 may include symbols 828 identifying one or more progressive jackpot prizes, such as mini, minor, major, and/or grand prize levels, or any suitable prize level. In various embodiments, each of the prize levels may be associated with a progressive prize value.

At step 716, the processor 62 of the game controller 60 at the gaming system 1 determines whether a predetermined number of scatter symbols are displayed at the plurality of display position 802. For example, the processor 62 may comprise an outcome generation controller 622 having a function allocator 622C configured to apply game functions 644 based on the symbols presented at display positions 802 in the array of display positions 802. The predetermined number of scatter symbols may be three symbols or any suitable number of symbols. Although the above example refers to identifying the presence of a predetermined number of scatter symbols, in certain embodiments it is contemplated that any suitable symbol as defined by the game functions 644 may be identified at step 716.

At step 718, the processor 62 of the game controller 60 at the gaming system 1 may trigger a predetermined number of free spins/games according to steps 704 through 714 if the presence of the predetermined number of scatter symbols is identified at step 716. In various embodiments, additional feature symbols 822, 826, 828 may be added to the reels to increase the chance of an event defined in steps 710 through 714 being triggered based on the presence of a particular symbol 822, 826, 828 at the selected display position 802 identified by the indicator symbol 810 during the free spins/games. For example, additional four pixie symbols 822, WILD symbols 826, progressive jackpot symbols 828, and/or any suitable feature symbols may be added to the reels to increase the chance of one of the events described in steps 710 through 714 occurring.

At step 720, the game is ended by the processor 62 of the game controller 60 at the gaming system 1. For example, the processor 62 may comprise an outcome generation controller 622 and an outcome evaluator 623. The outcome generation controller 622 generates a game outcome which will then be evaluated by outcome evaluator to determine whether it includes any winning combinations based on pay table 645. At the conclusion of the game, the win meter associated with the player and stored in meters 646 is updated based on awards allocated for winning combinations. In an embodiment, if the game is a feature game, the processor 62 of the gaming system 1 may revert to the primary game at the conclusion of the feature game. Additionally and/or alternatively, the player(s) may cash out at the conclusion of the game.

FIG. 8A is a screen shot of an example of a display 54 of a spinning reel game 800 having an indicator symbol 810 associated with a display position 802 that is presenting a first symbol type 822. FIG. 8B is a screen shot of an example of a display 54 of a spinning reel game 800 triggering a change of a second symbol type 824 at other display positions 802 from FIG. 8A to WILD symbols 826 in response to the first symbol type 822 being detected at the display position 802 associated with the indicator symbol 810. Referring to FIGS. 8A and 8B, a spinning reel game 800 is provided having an array of display positions 802. For example, the array of display positions 802 may be a grid of three rows and five columns or any suitable configuration. The spinning reel game 800 presents an indicator symbol 810 at a selected display position 802 in the array of display positions 802. The selected display position 802 may be randomly selected or may be a default position such as a center display position, among other things. In various embodiments, an animated character or symbol 812 may be provided with the indicator symbol 810 to draw additional attention to the indicator symbol 810. For example, as shown in FIG. 8A, the animated character or symbol 812 may be a pixie character or any suitable character or symbol. In various embodiments, the animated character or symbol 812 may move the indicator symbol 810 onto the single display position 802 and thereafter the animated character or symbol 812 may move off of the display 54, 800. The reels of the spinning reel game 800 spin after the display of the indicator symbol 810 at the selected display position 802. The reels of the spinning reel game 800 stop spinning to provide symbols 820, 822, 824, 826, 828 at each display position 802 in the array of display positions 802, including the selected display position 802 associated with the indicator symbol 810. For example, the symbols may include standard characters 820, scatter symbols, WILD symbols 826, jackpot symbols 828, character symbols 822, 824, and/or any suitable symbols.

Still referring to FIGS. 8A and 8B, if a particular symbol, such as the four pixies symbol 822 shown in FIG. 8A, lands in the selected display position 802 corresponding with the indicator symbol 810, a gaming function defined by game functions 644 may be triggered. For example, as shown in FIG. 8B, the presence of the four pixies symbol 822 in the selected display position 802 associated with the indicator symbol 810 triggers the pixie symbols 824 shown in FIG. 8A to change to WILD symbols 826 as shown in FIG. 8B. In an exemplary embodiment, the game may be associated with a theme. For example, FIGS. 8-10 are screenshots of the spinning reel game 800 having a pixie theme including various pixie characters 812 and symbols 822, 824. The spinning reel game 800 is presented at a display 54.

Figure 9A:
FIG. 9A is a screen shot of an example of a display of a spinning reel game having an indicator symbol associated with a display position that is presenting a WILD symbol.
Figure 9B:
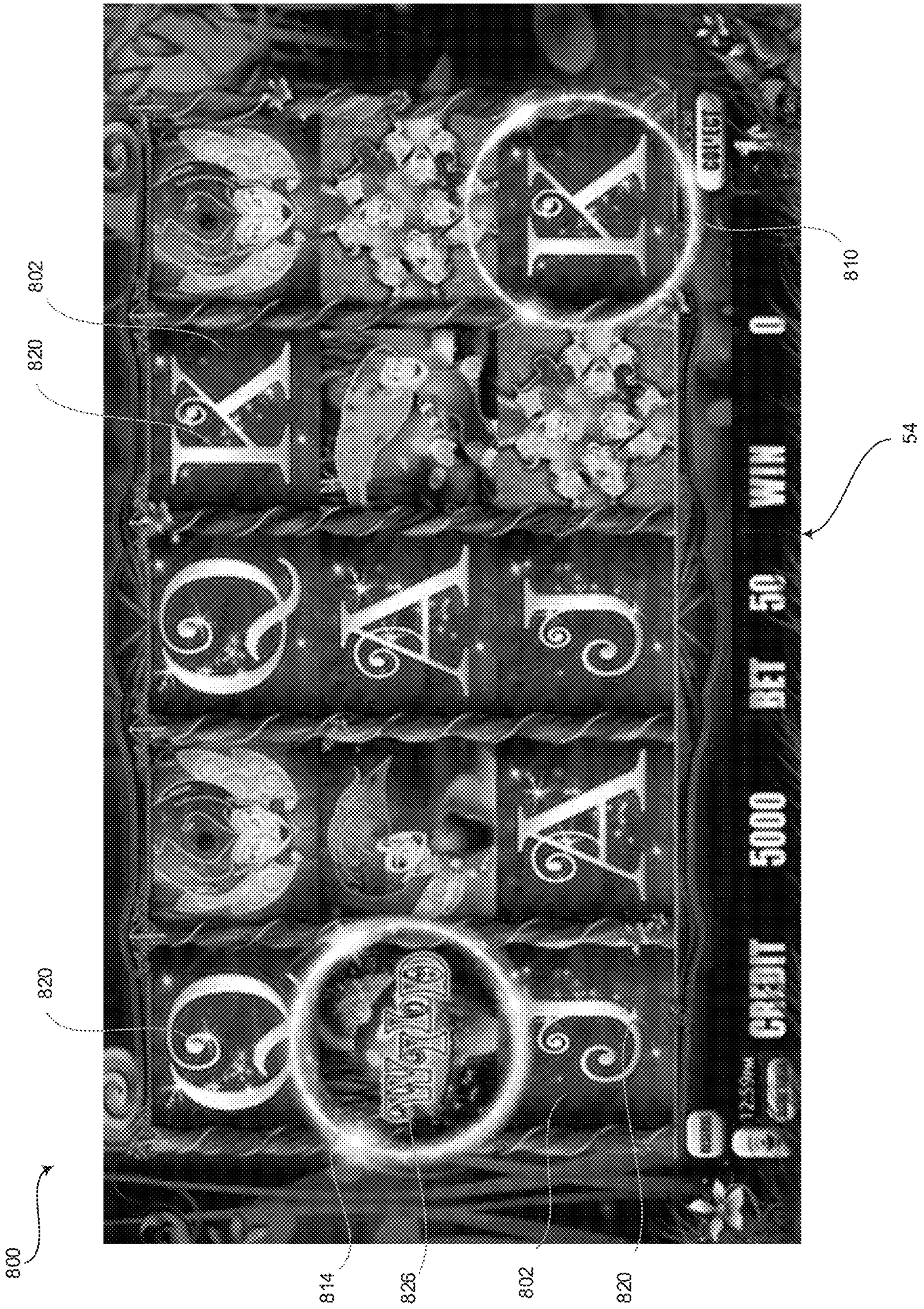
FIG. 9B is a screen shot of an example of a display of a spinning reel game triggering a hold of the WILD symbol at the display position associated with the indicator symbol from FIG. 9A and presenting an indicator symbol at a new selected display position for a re-spin of symbols at other non-held display positions.
Figure 10:
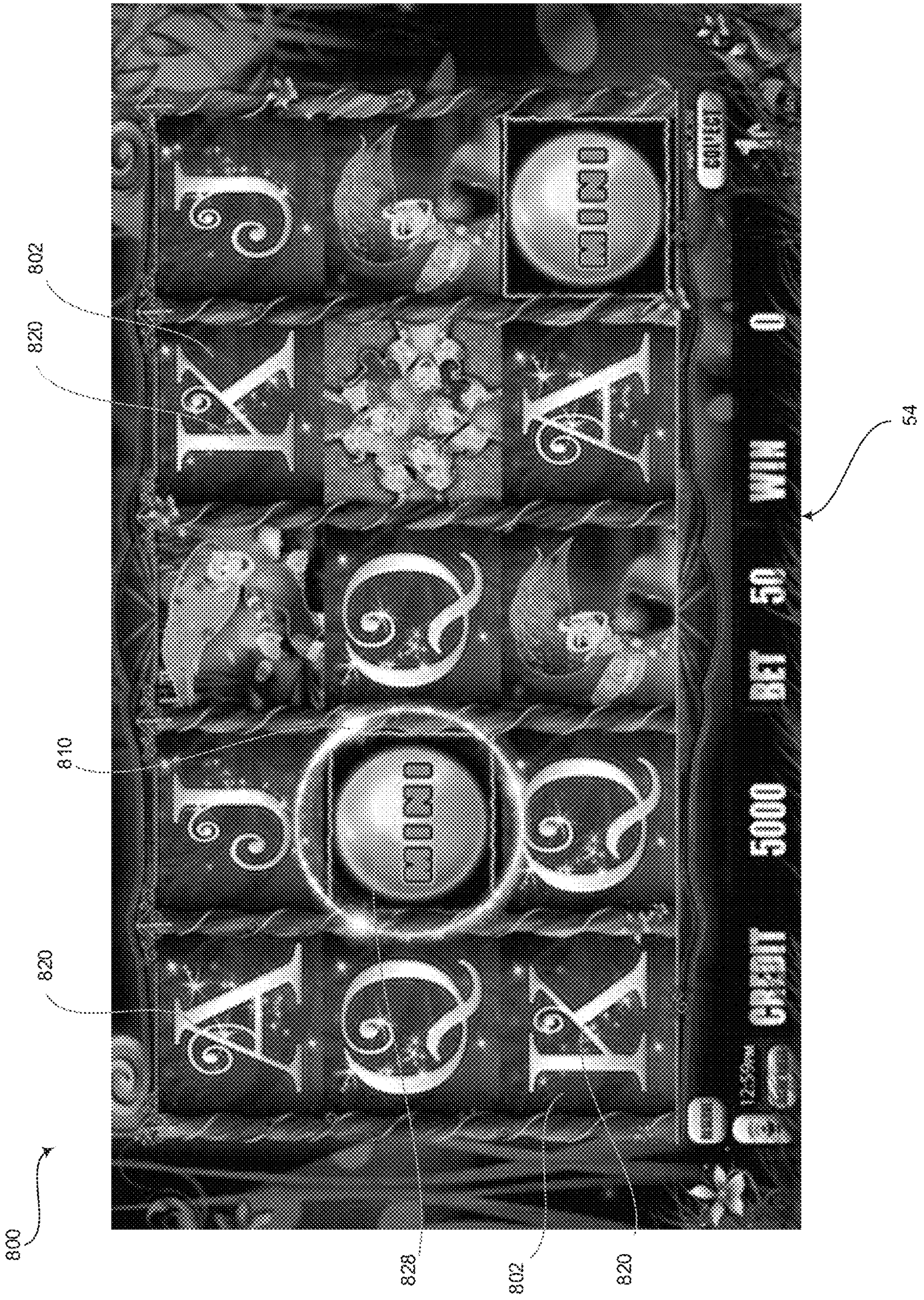
FIG. 10 is a screen shot of an example of a display of a spinning reel game having an indicator symbol associated with a display position that is presenting a progressive jackpot symbol.

FIG. 9A is a screen shot of an example of a display of a spinning reel game having an indicator symbol associated with a display position that is presenting a WILD symbol. FIG. 9B is a screen shot of an example of a display of a spinning reel game triggering a hold of the WILD symbol at the display position associated with the indicator symbol from FIG. 9A and presenting an indicator symbol at a new selected display position for a re-spin of symbols at other non-held display positions. Referring to FIGS. 9A and 9B, a spinning reel game 800 is provided having an array of display positions 802. The spinning reel game 800 presents an indicator symbol 810 at a selected display position 802 in the array of display positions 802. The reels of the spinning reel game 800 spin after the display of the indicator symbol 810 at the selected display position 802. The reels of the spinning reel game 800 stop spinning to provide symbols 820, 822, 824, 826, 828 at each display position 802 in the array of display positions 802, including the selected display position 802 associated with the indicator symbol 810. Still referring to FIGS. 9A and 9B, if a particular symbol, such as the WILD symbol 826 shown in FIG. 9A, lands in the selected display position 802 corresponding with the indicator symbol 810, a gaming function defined by game functions 644 may be triggered. For example, as shown in FIG. 9B, the presence of the WILD symbol 826 in the selected display position 802 associated with the indicator symbol 810 triggers a hold/freeze of the WILD symbol 826 that is marked with a hold/freeze indicator symbol 814 and a new indicator symbol 810 is then selected. The spinning reel game 800 may subsequently re-spin the reels to change the non-held symbols. The feature may continue until no further WILD symbols 826 land within the indicator symbol 810 display position 802.

FIG. 10 is a screen shot of an example of a display of a spinning reel game 800 having an indicator symbol 810 associated with a display position 802 that is presenting a progressive jackpot symbol 828. Referring to FIG. 10, a spinning reel game 800 is provided having an array of display positions 802. The spinning reel game 800 presents an indicator symbol 810 at a selected display position 802 in the array of display positions 802. The reels of the spinning reel game 800 spin after the display of the indicator symbol 810 at the selected display position 802. The reels of the spinning reel game 800 stop spinning to provide symbols 820, 822, 824, 826, 828 at each display position 802 in the array of display positions 802, including the selected display position 802 associated with the indicator symbol 810. Still referring to FIG. 10, if a particular symbol, such as the progressive jackpot symbol 828 shown in FIG. 10, lands in the selected display position 802 corresponding with the indicator symbol 810, the spinning reel game 800 may provide a progressive jackpot award corresponding with a progressive jackpot symbol 828. For example, the spinning reel game 800 may include symbols 828 corresponding with one or more progressive jackpot prizes each having an associated progressive prize value.

Aspects of the present invention provide a gaming system 1, 10, 100 for play of a game 800 comprising a credit input mechanism 24, 52.1, 108, 110, a display 14, 54, 106 and a game controller 60, 101. The game controller 60, 101 may comprise an indicator display device 622A, a symbol selector 622B, a function allocator 622C, and an award allocator 623. The credit input mechanism 24, 52.1, 108, 110 may be configured for player interaction to receive a physical item representing a monetary value for establishing a credit balance. The display 14, 54, 106 may present a game display 800 having a plurality of display positions 802. The indicator display device 622A may be configured to visually present an indicator symbol 810 on the display 14, 54, 106 relative to a single display position of the plurality of display positions 802 for visually identifying the single display position. The symbol selector 622B may be configured to, in accord with having established the credit balance, randomly select symbols 820, 822, 824, 826, 828 from a set of a plurality of symbols 643 and, after display of the indicator symbol 810, place the selected symbols 820, 822, 824, 826, 828 on the display 14, 54, 106 with at least one of the selected symbols 820, 822, 824, 826, 828 placed in each of the display positions 802 including the single display position. The function allocator 622C may be configured to determine which symbol 820, 822, 824, 826, 828 is placed in the single display positon 802 and perform a game function in response to the identity of the selected symbol 820, 822, 824, 826, 828 in the single display position 802. The award allocator 623 may be configured to allocate an award based on at least one of the placed symbols 820, 822, 824, 826, 828.

In various embodiments, the indicator display device 622A is configured to select the single display position of the plurality of display positions 802. In certain embodiments, the indicator display device 622A is configured to randomly select the single display position of the plurality of display positions 802. In a representative embodiment, the function allocator 622C is configured to change at least one of the placed selected symbols 822, 824 to another symbol 826 of the plurality of symbols 820, 822, 824, 826, 828, based on the identity of the selected symbol 822 in the single display position 802. In various embodiments, the set of symbols 643 includes a WILD symbol 826 and the another symbol is the WILD symbol 826. In certain embodiments, the award allocator 623 is configured to allocate an award after the game function 644 has been performed. In a representative embodiment, the set of symbols 643 includes a jackpot symbol 828 and the award allocator 623 is configured to award a jackpot prize when the selected symbol placed in the single display position 802 is the jackpot symbol 828.

In certain embodiments, the set of symbols 643 includes a WILD symbol 826. The function allocator 622C is configured to determine that the selected symbol placed in the single display position 802 is the WILD symbol 826. In response to the determination, the function allocator 622C locks the WILD symbol 826 in its said single display positon 802. The function allocator 622C causes the symbol selector 622B to select a second plurality of symbols 820, 822, 824, 826, 828 from the set of symbols 643. The function allocator 622C places the second plurality of symbols 820, 822, 824, 826, 828 in the display positions 802 except in the single display position where the WILD symbol 826 is placed. In a representative embodiment, the display positions 802 are configured in an array of columns and rows. In various embodiments, each column of the display positions 802 presents a spinning reel of the selected symbols 820, 822, 824, 826, 828 which stops to place the symbols 820, 822, 824, 826, 828 into the display positions 802.

In a representative embodiment, the indicator symbol 810 is a circular component configured for surrounding a portion of the single display position 802 and allowing the symbol 820, 822, 824, 826, 828 in the single display position 802 to be visible through the circular component. In various embodiments, the indicator symbol 810 further includes an animated pixie symbol 812 holding the circular component 810. In certain embodiments, the pixie symbol 812 moves the circular component 810 onto the single display position 802 and thereafter the pixie symbol 812 moves off of the display 14, 54, 106, 800. In a representative embodiment, the indicator display device 622A holds the indicator symbol 810 relative to the single position 802 during placement of the selected symbols 820, 822, 824, 826, 828 in respective display positions 802. In various embodiments, the indicator display device 622A is configured to display the indicator symbol 810 at the start of each game/spin. In certain embodiments, the indicator display device 622A is configured to select the single display position 802 in a weighted manner 642. In a representative embodiment, the function allocator 622C is configured to trigger a bonus game of a plurality of free games in response to the identity of the symbol 820, 822, 824, 826, 828 placed in the single display position 802. In various embodiments, the function allocator 622C is configured to lock a WILD symbol 626 placed in the single display position 802 for all of the free games.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the disclosure. In particular, it will be apparent that certain features of embodiments of the disclosure can be employed to form further embodiments.

It is to be understood that, if any prior art is referred to herein, such reference does not constitute an admission that the prior art forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

What is claimed is:

1. A gaming system, comprising:

a display device;

a credit input mechanism configured to receive a credit input representing a monetary value for establishing a credit balance, the credit balance being increasable and decreasable based at least on wagering activity;

a hardware meter configured to monitor credits input via the credit input mechanism;

a reading device configured to interface with a player tracking device that includes portable storage media storing data capable of being read wirelessly via the reading device, the data including information associated with a player; and a game controller comprising a random number generator and a memory that stores instructions executed by the game controller, wherein execution of the instruction causes the game controller to at least:

access the credit input mechanism to determine a current credit balance based on the credits identified by the hardware meter and based on the wagering activity associated with the player;

determine that an additional credit source is to be accessed before the game controller begins to execute the instructions, the additional credit source comprising the player tracking device;

instruct the reading device to access one or more credits stored on the player tracking device, such that the one or more credits are transferred from the player tracking device to the gaming system;

upon receiving the one or more credits from the player tracking device, randomly select one or more first display positions from display positions on more than three reels displayed by the display device as one or more first trigger positions based on an outcome of the random number generator of the game controller according to indicator symbol data stored in the memory and weighted to place the indicator symbol on one of the last three reels to stop spinning;

display, via a display controller of the game controller, an indicator symbol at the one or more first display positions of the display device to visually identify the one or more first display positions as the one or more first trigger positions;

randomly select symbols of a game outcome based on the random number generator;

spin and stop virtual reels to present the selected symbols of the game outcome at the display positions of the display device including the one or more first display positions identified by the indicator symbol as the one or more first trigger positions; and in response to the virtual reels presenting a predetermined symbol at one of the one or more first trigger positions identified by the indicator symbol:

hold the predetermined symbol at the one of the one or more first trigger positions;

randomly select, based on the random number generator, one or more second display positions from the display positions of the display device as one or more second trigger positions;

move the indicator symbol to the one or more second display positions to visually identify the one or more second display positions as the one or more second trigger positions, and, via the display controller of the game controller, display the indicator symbol at the one or more second display positions as configured to surround at least a portion of a single display position while allowing a symbol presented at the display position to be viewable through the indicator symbol; and upon determining that the virtual reels have presented a progressive prize symbol at one of the one or more first trigger positions, triggering an award of a progressive prize to the player having an amount that is based on the determined current credit balance, wherein the award is at least partially distributed to the player tracking device.

2. The gaming system of claim 1, wherein the prize is a jackpot prize in response to the virtual reels presenting a jackpot symbol at one of the one or more first trigger positions.

3. The gaming system of claim 1, wherein execution of the instructions causes the game controller to change at least one of the symbols of the game outcome to another symbol in response to the virtual reels presenting the predetermined symbol at one of the one or more first trigger positions.

4. The gaming system of claim 3, wherein the another symbol is a WILD symbol.

5. The gaming system of claim 1, wherein execution of the instructions causes the game controller, in response to the virtual reels presenting the predetermined symbol at one of the one or more first trigger positions, to:

replace non-held symbols presented at the display positions of the display device with replacement symbols; and present an award based on the held predetermined symbol and the replacement symbols.

6. The gaming system of claim 1, wherein execution of the instructions causes the game controller to:

in response to the virtual reels presenting the predetermined symbol at one of the one or more trigger positions, replace non-held symbols presented at display positions of the display device with replacement symbols; and in response to one of the replacement symbols including the predetermined symbol at one of the one or more second trigger positions, initiate a replacement round comprising:

holding the predetermined symbol at the one of the one or more second trigger positions;

randomly selecting one or more third display position as one or more third trigger positions based on the random number generator; and moving the indicator to the one or more third display positions to visually identify the one or more third display positions as the one or more third trigger positions.

7. The gaming system of claim 6, wherein execution of the instructions causes the game controller to trigger replacement rounds until the replacement symbols fail to place the predetermined symbol at a display position identified by the indicator as a trigger position.

8. The gaming system of claim 7, wherein execution of the instructions causes the game controller to present an award based on the held predetermined symbols and the replacement symbols for each replacement round.

9. The gaming system of claim 6, wherein:

the one or more first trigger positions comprises a quantity of first trigger positions; and the one or more second trigger positions comprises a quantity of second trigger positions that is larger than the quantity of first trigger positions if a quantity of the predetermined symbols displayed by the display device exceeds a threshold quantity.

10. The gaming system of claim 1, wherein execution of the instructions causes the game controller to present the virtual reels, when spinning, with symbols passing through the indicator symbol displayed on the display device.

11. The gaming system of claim 1, wherein execution of the instructions causes the game controller to increase a size of the indicator symbol such that the indicator visually identifies a plurality of the one or more second display positions as second trigger positions.

12. A method of a gaming system, the method comprising:

accessing a credit input mechanism within the gaming system, wherein the credit input mechanism is configured to receive a credit input representing a monetary value for establishing a credit balance, the credit balance being increasable and decreasable based at least on wagering activity, the gaming system further including a hardware meter configured to monitor credits input via the credit input mechanism and a reading device configured to interface with a player tracking device that includes portable storage media storing data capable of being read wirelessly via the reading device, the data including information associated with a player, to determine a current credit balance based on the credits identified by the hardware meter and based on the wagering activity associated with the player;

determining that an additional credit source is to be accessed, the additional credit source comprising the player tracking device;

instructing the reading device to access one or more credits stored on the player tracking device, such that the one or more credits are transferred from the player tracking device to the gaming system;

upon receiving the one or more credits from the player tracking device, randomly selecting, with a game controller of the gaming system, a quantity of first display positions from display positions on more than three reels by a display device of the gaming system as a quantity of first trigger positions based on an outcome of a random number generator of the game controller according to indicator symbol data stored in memory and weighted to place the indicator symbol on one of the last three reels to stop spinning;

displaying, with a display controller of the display device, an indicator symbol at the quantity of first display positions of the display device to visually identify the quantity of first display positions as the quantity of first trigger positions;

randomly selecting symbols of a game outcome based on a random number generator of the gaming system;

spinning and stopping virtual reels to present the selected symbols of the game outcome at the display positions of the display device including the quantity of first display positions identified by the indicator symbol as the quantity of first trigger positions; and in response to the virtual reels presenting one or more first instances of a predetermined symbol in the quantity of first trigger positions identified by the indicator symbol:

holding the one or more first instances of the predetermined symbol at the quantity of first trigger positions;

randomly selecting, based on the random number generator, a quantity of second display positions from the display positions of the display device as a quantity of second trigger positions;

moving the indicator symbol to the quantity the second display positions to visually identify the quantity of second display positions as the quantity of second trigger positions, and, via the display controller of the game controller, display the indicator symbol at the one or more second display positions as configured to surround at least a portion of a single display position while allowing a symbol presented at the display position to be viewable through the indicator symbol; and upon determining that the virtual reels have presented a progressive prize symbol at one of the one or more first trigger positions, triggering an award of a progressive prize to the player having an amount that is based on the determined current credit balance, wherein the award is at least partially distributed to the player tracking device.

13. The method of claim 12, further comprising, in response to the virtual reels presenting one or more first instances of the predetermined symbol in the quantity of first trigger positions:

replacing non-held symbols in the display positions of the display device with replacement symbols; and presenting an award based on the held one or more first instances of the predetermined symbol and the replacement symbols.

14. The method of claim 12, further comprising, in response to the virtual reels presenting one or more first instances of the predetermined symbol in the quantity of first trigger positions:

replacing non-held symbols presented at display positions of the display device with replacement symbols; and performing another round of holding, selecting, moving, and replacing in response to the replacement symbols placing one or more second instances of the predetermined symbol in the quantity of second trigger positions.

15. The method of claim 14, further comprising performing additional rounds of holding, selecting, moving, replacing until the replacement symbols fail to place an instance of the predetermined symbol at a trigger position.

16. The method of claim 15, further comprising presenting an award based on the held instances of the predetermined symbol and the replacement symbols after each round of holding, selecting, moving, and replacing.

17. The method of claim 14, further comprising visually increasing a size the indicator such that the quantity of second trigger positions identified by the indicator is greater than the quantity of first trigger positions.

18. A non-transitory computer-readable storage medium comprising instructions which, when executed by a gaming system, cause the gaming system to:

access a credit input mechanism within the gaming system, wherein the credit input mechanism is configured to receive a credit input representing a monetary value for establishing a credit balance, the credit balance being increasable and decreasable based at least on wagering activity, the gaming system further including a hardware meter configured to monitor credits input via the credit input mechanism and a reading device configured to interface with a player tracking device that includes portable storage media storing data capable of being read wirelessly via the reading device, the data including information associated with a player, to determine a current credit balance based on the credits identified by the hardware meter and based on the wagering activity associated with the player;

determine that an additional credit source is to be accessed before a game controller begins to execute the instructions, the additional credit source comprising the player tracking device;

instruct the reading device to access one or more credits stored on the player tracking device, such that the one or more credits are transferred from the player tracking device to the gaming system;

upon receiving the one or more credits from the player tracking device, randomly select a first display position from display positions on more than three reels displayed by a display device of the gaming system as a first trigger position based on an outcome of a random number generator of the game controller according to indicator symbol data stored in memory and weighted to place the indicator symbol on one of the last three reels to stop spinning;

display, via a display controller of the game controller, an indicator symbol that visually identifies the first display position of the display device as the first trigger position;

randomly select symbols of a game outcome based on the random number generator;

spin virtual reels on the display device to present symbols passing through display positions of the display device;

stop the virtual reels to present the selected symbols of the game outcome at the display positions of the display device including the first trigger position; and in response to the virtual reels presenting a first instance of a predetermined symbol at the first trigger position:

hold the first instance of the predetermined symbol at the first trigger position;

randomly select a plurality of second display positions from the display positions of the display device as a plurality of second trigger positions;

move and increase a size of the indicator symbol such that the indicator visually identifies the plurality of second display positions as the plurality of second trigger positions, and, via the display controller of the game controller, display the indicator symbol at the one or more second display positions as configured to surround at least a portion of a single display position while allowing a symbol presented at the display position to be viewable through the indicator symbol; and upon determining that the virtual reels have presented a progressive prize symbol at one of the one or more first trigger positions, triggering an award of a progressive prize to the player having an amount that is based on the determined current credit balance, wherein the award is at least partially distributed to the player tracking device.

19. The non-transitory computer-readable storage medium of claim 18, wherein the instructions, when executed, cause the gaming system to:

replace non-held symbols in the display positions of the display device with replacement symbols; and present an award based on the held first instance of the predetermined symbol and the replacement symbols.

20. The non-transitory computer-readable storage medium of claim 18, wherein the instructions, when executed, cause the gaming system to:

replace non-held symbols presented at display positions of the display device with replacement symbols; and perform another round of holding, moving, and replacing in response to the replacement symbols placing at least one instance of the predetermined symbol in one of the plurality of second trigger positions.

* * * * *